United States Patent Office 2,841,587
Patented July 1, 1958

2,841,587

SEPARATION OF MIXTURES OF DESERPIDINE AND RESERPINE BY NITROSATION

Alfred Becker, Munchenstein, Switzerland, assignor to Ciba Pharmaceutical Products Inc., Summit, N. J.

No Drawing. Application April 3, 1957
Serial No. 650,301

Claims priority, application Switzerland April 9, 1956

8 Claims. (Cl. 260—287)

This invention relates to the production of deserpidine free from reserpine from a mixture of reserpine and deserpidine.

It is known that these two alkaloids have been isolated from plants of the Rauwolfia species. The separation of deserpidine from reserpine has hitherto, however, been tedious and difficult on account of their very similar physical properties and was only possible by means, for example, of chromatography or repeated fractional crystallization. The production of a deserpidine free from reserpine was especially difficult.

The present invention is based on the observation that deserpidine can be obtained free from reserpine in a simple manner when a mixture of reserpine and deserpidine is treated with a nitrosating agent and the deserpidine separated from the nitrosation products. In a surprising manner is has been shown that in contradistinction to reserpine, deserpidine is only attacked with great difficulty by these agents.

An especially suitable starting material is an alkaloid mixture obtained by the isolation of reserpine from vegetable material of the Rauwolfia species, especially of *Rauwolfia canescens*, primarily that occurring as mother liquor after a first crystallization of reserpine. It is also possible to use as starting materials products that have been freed from reserpine to a considerable extent and that contain the deserpidine in comparatively higher concentration, for example 85 parts to 15 parts of reserpine, such as are obtained by treatment of an extract with thiocyanic acid and separation of the more difficultly soluble reserpine salt.

The reaction with a nitrosating agent is carried out in the manner known per se. It can be advantageously effected with nitrous acid in aqueous-alcoholic solution. Preferably there is used as reagent sodium nitrite in acetic acid solution. The preferred temperature is about 20° C. because at higher temperatures, say 50–80° C. part of the deserpidine is also attacked by the nitrosating agent.

From the reaction product, the deserpidine can be separated in a simple manner, for example by filtration of the more difficultly soluble nitrosation products and recrystallization of the deserpidine which is more easily soluble in chloroform-ether. Deserpidine can be further purified in known manner, for example by taking up in acetic acid, precipitation with ammonia and subsequent recrystallization.

The following examples illustrate the invention:

*Example 1*

A mixture of 25 mg. of reserpine and 25 mg. of deserpidine is dissolved in 2.5 cc. of methanol and 2.5 cc. of glacial acetic acid. The solution is cooled to 20° C., treated with 25 cc. of 0.2 N-sodium nitrite and stirred mechanically for 30 minutes. Filtration is then carried out from the nitrosation products of the reserpine and the filtrate rendered alkaline with excess of ammonia solution with cooling, whereby the deserpidine base is precipitated. The latter is filtered off, washed with water and dried at 80° C. (Yield 28 mg. of crude product.) The crude deserpidine is dissolved in 0.5 cc. of chloroform and treated with 10 cc. of ether and 5 cc. of petroleum ether. The separated brown flocks are filtered off and the residue washed with an ether-petroleum ether mixture (2:1). The filtrate is extracted 7 times, in each case with 25 cc. of 2 N-acetic acid, the combined and filtered extracts treated with cooling with excess of ammonia and the precipitated deserpidine base separated by filtration. After drying 21 mg. of deserpidine are obtained of melting point 225–230° C.

*Example 2*

A mixture of 75 mg. of deserpidine and 25 mg. of reserpine is dissolved in 2.5 cc. of methanol and 2.5 cc. of glacial acetic acid. There are added 30 cc. of 0.2 N-sodium nitrite having a temperature of 20° C. and the whole is stirred mechanically for 30 minutes at that temperature. This operation is followed by filtration and washing with water (first filtrate).

The filter residue is dissolved in 2.5 cc. of methanol and 5 cc. of glacial acetic acid. There are added 25 cc. of 0.2 N-sodium nitrite of 20° C. and the whole is stirred mechanically for 30 minutes at that temperature, then filtered to remove insoluble constituents. The second filtrate so obtained is combined with the first filtrate. By adding 25 cc. of a concentrated solution of ammonia (about 30 percent strength) the deserpidine base is precipitated. This base is dissolved in 0.5 cc. of chloroform and mixed with 10 cc. of ether and 5 cc. of petroleum ether. The brown flakes that separate are filtered off and the residue washed with a 2:1 mixture of ether and petroleum ether.

The filtrate is agitated 7 times with 25 cc. of 2 N-acetic acid each time, the extracts are combined and filtered, and mixed, while cooling, with an excess of ammonia, and the resulting deserpidine base is separated by filtration. On drying there are obtained 50 mg. of deserpidine melting at 225–230° C.

What is claimed is:

1. Process for the preparation of deserpidine free from reserpine, wherein a mixture of reserpine and deserpidine is subjected to the action of nitrous acid at a temperature below 80° C. to form a reaction mixture containing deserpidine and nitrosation products and the deserpidine is separated from the nitrosation products.

2. Process for the preparation of deserpidine free from reserpine, wherein a mixture of alkaloids obtained by isolation of reserpine from plant material of the Rauwolfia species is subjected to the action of nitrous acid at a temperature below 80° C. to form a reaction mixture containing deserpidine and nitrosation products and the deserpidine is separated from the nitrosation products.

3. Process for the preparation of deserpidine free from reserpine, wherein a mixture of alkaloids obtained by isolation of reserpine from *Rauwolfia canescens* is subjected to the action of nitrous acid at a temperature below 80° C. to form a reaction mixture containing deserpidine and nitrosation products and the deserpidine is separated from the nitrosation products.

4. Process for the preparation of deserpidine free from reserpine, wherein a mixture of alkaloids obtained by isolation of reserpine from plant material of the Rauwolfia species and which is freed from reserpine to a considerable extent is subjected to the action of nitrous acid at a temperature below 80° C. to form a reaction mixture containing deserpidine and nitrosation products and the deserpidine is separated from the nitrosation products.

5. Process for the preparation of deserpidine free from reserpine, wherein a product containing reserpine and deserpidine is treated with thiocyanic acid, the more difficultly soluble reserpine salt is separated, the residue subjected to the action of nitrous acid at a temperature below 80° C. to form a reaction mixture containing deserpidine and nitrosation products and the deserpidine is separated from the nitrosation products.

6. Process for the preparation of deserpidine free from reserpine, wherein a mixture of reserpine and deserpidine is treated with nitrous acid at about 20° C. to form a reaction mixture containing deserpidine and nitrosation products and the deserpidine is separated from the nitrosation products.

7. Process for the preparation of deserpidine free from reserpine, wherein a mixture of reserpine and deserpidine is treated with sodium nitrite in acetic acid solution at a temperature below 80° C. to form a reaction mixture containing deserpidine and nitrosation products and the deserpidine is separated from the nitrosation products.

8. Process for the preparation of deserpidine free from reserpine, wherein a mixture of reserpine and deserpidine is treated with sodium nitrite in acetic acid solution at about 20° C. to form a reaction product containing deserpidine and nitrosation products, and the deserpidine is separated from the nitrosation products.

No references cited.